United States Patent
Shiomi et al.

(10) Patent No.: US 8,358,307 B2
(45) Date of Patent: Jan. 22, 2013

(54) IMAGE PROCESSING DEVICE, DISPLAY DEVICE, IMAGE PROCESSING METHOD, PROGRAM, AND STORAGE MEDIUM

(75) Inventors: Makoto Shiomi, Osaka (JP); Tamotsu Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 278 days.

(21) Appl. No.: 12/863,212

(22) PCT Filed: Dec. 10, 2008

(86) PCT No.: PCT/JP2008/072403
§ 371 (c)(1),
(2), (4) Date: Jul. 16, 2010

(87) PCT Pub. No.: WO2009/130820
PCT Pub. Date: Oct. 29, 2009

(65) Prior Publication Data
US 2011/0043526 A1    Feb. 24, 2011

(30) Foreign Application Priority Data

Apr. 21, 2008    (JP) .................... 2008-110737

(51) Int. Cl.
*G06T 17/00*    (2006.01)
*G09G 5/00*    (2006.01)
*G06K 9/40*    (2006.01)

(52) U.S. Cl. .................... 345/428; 345/606; 382/266

(58) Field of Classification Search .................... 345/428, 345/611, 606; 382/164, 173, 266, 269
See application file for complete search history.

(56) References Cited

U.S. PATENT DOCUMENTS

| | | | |
|---|---|---|---|
| 5,101,440 A * | 3/1992 | Watanabe et al. | 382/168 |
| 5,534,940 A | 7/1996 | Sato et al. | |
| 5,666,164 A | 9/1997 | Kondo et al. | |
| 5,940,132 A | 8/1999 | Kondo et al. | |
| 6,710,781 B1 | 3/2004 | Saito | |

(Continued)

FOREIGN PATENT DOCUMENTS

EP    1 705 636 A1    9/2006

(Continued)

OTHER PUBLICATIONS

Official Communication issued in International Patent Application No. PCT/JP2008/072403, mailed on Jan. 27, 2009.

(Continued)

*Primary Examiner* — James A Thompson
*Assistant Examiner* — Sarah Le
(74) *Attorney, Agent, or Firm* — Keating & Bennett, LLP

(57) ABSTRACT

Upscaling circuits include a difference circuit which calculates a gradation value of a target pixel with use of differentiation or difference of gradation values in vicinity to the target pixel, so that an edge of an article pictured in an image can be extracted; an averaging circuit which calculates a gradation value of a target pixel by averaging gradation values in vicinity to the target pixel; and a correlation operation circuit which calculates a correlation value indicating a correlation between difference image data and averaged image data, the difference image data being produced by carrying out the difference operation process on the divided image data, and the averaged image data being produced by carrying out the difference operation process and the averaging process on the divided image data. Further, an interpolation process is carried out on the divided image data with an interpolation method using the calculated correlation value.

7 Claims, 13 Drawing Sheets

U.S. PATENT DOCUMENTS

| | | |
|---|---|---|
| 7,039,254 B1 * | 5/2006 | Maenaka et al. ............... 382/300 |
| 2002/0028028 A1 | 3/2002 | Michel |
| 2003/0169247 A1 | 9/2003 | Kawabe et al. |
| 2005/0219188 A1 | 10/2005 | Kawabe et al. |
| 2008/0068402 A1 * | 3/2008 | Ioka et al. ..................... 345/660 |
| 2008/0106641 A1 | 5/2008 | Chou |
| 2008/0284719 A1 | 11/2008 | Yoshida |

FOREIGN PATENT DOCUMENTS

| | | |
|---|---|---|
| EP | 1 936 600 A2 | 6/2008 |
| JP | 2001-346070 A | 12/2001 |
| JP | 3243861 B2 | 1/2002 |
| JP | 2002-064704 A | 2/2002 |
| JP | 2002-099250 A | 4/2002 |
| JP | 2003-255915 A | 9/2003 |
| JP | 2004-184937 A | 7/2004 |
| JP | 2004-212503 A | 7/2004 |
| JP | 2005-293265 A | 10/2005 |
| JP | 2005-309338 A | 11/2005 |
| JP | 2005-346639 A | 12/2005 |
| JP | 3766231 B2 | 4/2006 |
| JP | 2006-308665 A | 11/2006 |
| JP | 2007-225871 A | 9/2007 |
| JP | 2007-310319 A | 11/2007 |
| JP | 2007-322944 A | 12/2007 |
| JP | 2008-021207 A | 1/2008 |
| JP | 2008-116554 A | 5/2008 |
| JP | 2008-287118 A | 11/2008 |
| JP | 2009-031585 A | 2/2009 |

OTHER PUBLICATIONS

Official Communication issued in corresponding International Patent Application No. PCT/JP2009/054712, mailed on Jun. 9, 2009.

Official Communication issued in corresponding International Patent Application No. PCT/JP2009/054936, mailed on Jun. 9, 2009.

Shiomi, "Control Device for Liquid Crystal Display Device. Liquid Crystal Display Device, Method for Controlling Liquid Crystal Display Device, Program, and Storage Medium for Program", U.S. Appl. No. 12/736,644, filed Oct. 26, 2010.

Shiomi, "Control Device for Liquid Crystal Display Device. Liquid Crystal Display Device, Method for Controlling Liquid Crystal Display Device, Program, and Storage Medium", U.S. Appl. No. 12/736,660, filed Oct. 27, 2010.

* cited by examiner

IMAGE PROCESSING DEVICE, DISPLAY DEVICE, IMAGE PROCESSING METHOD, PROGRAM, AND STORAGE MEDIUM

TECHNICAL FIELD

The present invention relates to an image processing device and an image processing method for upscaling inputted image data from one resolution to higher resolution.

BACKGROUND ART

Conventionally, a relatively considerable amount of studies have been made for upscaling technique with which resolution of inputted image data is enhanced.

The simplest methods of the resolution-enhancing technique can be, for example, a bilinear method, a bicubic method, and a LANCZOS method in which target pixel information is interpolated with the use of a simple filter. However, these methods only compensates, based on a specific rule, a gap between pixels in the inputted image data. Accordingly, the methods can only provide an image having sharpness substantially equivalent to that of an original image.

On the other hand, Patent Literature 1 for example discloses a technique in which an interpolation parameter is selected in accordance with a surrounding luminance pattern of a target pixel, and an upscaling process is carried out with the use of the selected interpolation parameter. Moreover, Patent Literature 1 also discloses a technique for improving, by experience and learning, accuracy of selecting a matching pattern in accordance with luminance variations.

Patent Literature 1

Japanese Patent No. 3243861 (Publication Date: Jun. 24, 1994)

SUMMARY OF INVENTION

However, according to the technique of Patent Literature 1, the interpolation is carried out while continuity of gradation at all azimuths is maintained. This presents a problem that appropriate interpolation cannot be carried out in an edge part of an article pictured in the image. Therefore, the technique of Patent Literature 1 is not optimum for a case where an image having higher resolution is needed.

In order to solve the problem, it may be possible to extract an edge part contained in the inputted image data and then carry out interpolation on the edge part based on an edge direction of the edge part.

However, in order to carry out such process, it is necessary to (i) check gradation variations across a whole image (or an extremely large area in the image) and (ii) judge whether or not the gradation variations define an outline of different areas included in the image, for judging whether or not a part in which a gradation is different from that of an adjacent pixel is an edge of something pictured in the image. This presents a problem that a size of a circuit for detecting the edge becomes large. Note that, in order to avoid enlarging the size of the circuit, a method can be used in which a reduced-size image in which a block having a proper size (e.g., an area of 8×8 dots) is averaged, as carried out for extracting an edge in MPEG data. However, with the method, it is not possible to achieve sufficient accuracy of extracting an edge, whereby a high-resolution image cannot be produced. This can cause (i) a whole block to be blurred and (ii) misjudgment of an edge which is not larger than the block.

In particular, DVI and HD-SDI, etc. are known as transmission standards for transmitting a high-resolution video signal. However, for example, in a case where image data (high-definition data) having display capacity of a 2K1K class (approximately 2000 horizontal pixels×1000 vertical pixels) is to be upscaled to image data having display capacity of a 4K2K class (approximately 4000 horizontal pixels×2000 vertical pixels), the upscaled video signal having the 4K2K class cannot be transmitted through a single transmission line with the conventional transmitting standards. Accordingly, it is necessary to divide the upscaled video signal into video signals for a plurality of areas so that the divided video signals can be transmitted through a plurality of transmission lines.

Note that the term 4K2K is used in enhancement of digital cinema and high-definition data. In cinema, 4K2K indicates resolution of 4096 dots×2160 lines. In high-definition data, 4K2K indicates resolution of 3840 dots×2160 lines. Similarly, the term 2K1K is used in association with 4K2K, which 2K1K generally indicates resolution of 2048 dots×1080 lines and resolution of 1920 dots×1080 lines. The two systems of transmission standards are similarly provided. Therefore, the transmission standards are generally referred to as 4K2K and 2K1K, respectively.

However, in order to appropriately detect an edge of an article pictured in an image, it is necessary to check gradation variations across the whole image (or an extremely large area in the image) as described above. This presents a problem that continuity of an edge cannot be properly checked when the image is divided into a plurality of areas. Such a problem frequently occurs in a border area of each of the divided images.

Moreover, according to the conventional method for detecting an edge, it is necessary to check gradation variations across the whole image (or an extremely large area in the image). This presents problems that processing time for the edge detection becomes long and manufacturing cost is increased because a size of a circuit becomes large.

The present invention is accomplished in view of the problem, and an object thereof is to provide an image processing device which (i) divides inputted image data into plural pieces of image data of a plurality of areas and (ii) causes the plural pieces of image data to have high-resolution, so that a high-resolution image can be produced without increasing a circuit size and processing time.

In order to attain the object, an image processing device of the present invention includes: a dividing process section which divides inputted image data into a plural pieces of divided image data; and a plurality of upscaling process sections which enhance resolution of each of the plural pieces of divided image data, respectively, the dividing process section producing the plural pieces of divided image data so that each one of the plural pieces of divided image data shares a portion with its adjacent one of the plural pieces of divided image data, so that border areas of that one and its adjacent one of the plural pieces of divided image data overlap with each other, each of the plurality of upscaling process sections including: a difference operation section which carries out a difference operation process in which a gradation value of a target pixel is calculated by an operation with use of differentiation or difference of gradation values in vicinity to the target pixel, the gradation value of the target pixel being used for extracting an edge of an article pictured in an image, an averaging process section which carries out an averaging process in which an average value of the gradation values in vicinity to the target pixel is calculated as a gradation value of the target pixel; a correlation operation section which carries out calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process; and an interpolation process section which carries out an interpolation process on the plural pieces of divided image data with use of an interpolation method which is selected in accordance with the correlation value.

According to the configuration, each of the plurality of upscaling process sections including: a difference operation section which carries out a difference operation process in which a gradation value of a target pixel is calculated by an operation with use of differentiation or difference of gradation values in vicinity to the target pixel, the gradation value of the target pixel being used for extracting an edge of an article pictured in an image, an averaging process section which carries out an averaging process in which an average value of the gradation values in vicinity to the target pixel is calculated as a gradation value of the target pixel; a correlation operation section which carries out calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process. The correlation value calculated with the configuration is used for appropriately judging whether a vicinity to the target pixel is an edge part or non-edge part. That is, in the non-edge part, noise and thin lines, etc., other than the edge are eliminated through the averaging process, and accordingly the correlation value becomes small. On the other hand, the edge part does not change so much through the averaging process, whereby the correlation value becomes large. Therefore, with the use of the correlation value, it is possible to appropriately judge whether the vicinity of the target pixel is an edge part or a non-edge part.

Moreover, according to the configuration, the interpolation process section carries out interpolation process on the plural pieces of divided image data with an interpolation method selected in accordance with the correlation value, and accordingly the plural pieces of divided image data is upscaled. This makes it possible to carry out respective different interpolation processes on the edge part and the non-edge part. Accordingly, a high-resolution image can be produced.

Each of the plural pieces of divided image data only needs to include gradation values in vicinity to each target pixel to be referred to in the difference operation process. Accordingly, it is not necessary to check the whole image, unlike the conventional method for edge detection. This makes it possible to (i) use a small image data for the edge detection process, (ii) reduce a circuit size, and (iii) reduce processing time.

Each of the plurality of upscaling circuits can carry out the difference operation process, the averaging process, the calculation process of the correlation value, and the interpolation process, concurrently with the other of the plurality of upscaling circuits.

According to the configuration, each of the plurality of upscaling circuits carry out the difference operation process, the averaging process, the calculation process of a correlation value, and the interpolation process, without referring to one of the plural pieces of divided image data corresponding to the other one of the plurality of upscaling circuits. Accordingly, each of the plurality of upscaling circuits can carry out the processes concurrently with the other of the plurality of upscaling circuits. This makes it possible to reduce time for upscaling the whole image.

Each of the plurality of upscaling process sections can include an edge-distinguishing section which distinguishes, by comparing the correlation value in each pixel with a predetermined threshold value, an edge part from a non-edge part contained in each of the plural pieces of divided image data; and the interpolation process section can carry out the interpolation process on the edge part with an interpolation method with which the edge part stands out more than the non-edge part.

According to the configuration, the edge part and the non-edge part can be clearly distinguished. When the interpolation process is carried out on the edge part with the interpolation method with which the edge part stands out more than the non-edge part, it is possible to produce an upscaled image having high-resolution in which image the edge is emphasized more sharply.

The difference operation section can carry out (i) a horizontal difference operation process for extracting a horizontal edge contained in each of the plural pieces of divided image data and (ii) a vertical difference operation process for extracting a vertical edge contained in each of the plural pieces of divided image data; when a target pixel is judged as an edge part, the edge-distinguishing section can calculate an inclined angle of the edge, the inclined angel of edge being a ratio between a gradation value of the target pixel after the horizontal difference operation process and a gradation value of the target pixel after the vertical difference operation process; the interpolation process section can carry out interpolation process on an interpolation pixel in the edge part with use of gradation values of pixels which are adjacent to the interpolation pixel and selected in the order of distance from a straight line which passes through the interpolation pixel and extends in parallel with an inclining direction of the edge, the number of the pixels to be selected being equal to or smaller than a predetermined number, and the interpolation process section can carry out interpolation process on an interpolation pixel in the non-edge part with use of gradation values of pixels which are adjacent to the interpolation pixel.

According to the configuration, the edge direction can be detected by calculating a ratio, as an inclined angle of the edge, between a gradation value of the target pixel after the horizontal difference operation process and a gradation value of the target pixel after the vertical difference operation process. Then, the interpolation process is carried out on an interpolation pixel in the edge part, with use of gradation values of pixels which are adjacent to the interpolation pixel and selected in the order of distance from a straight line which passes through the interpolation pixel and extends in parallel with the inclining direction of the edge, the number of the pixels to be selected being smaller than predetermined number. Further, the interpolation process is carried out on an interpolation pixel in the non-edge part, with use of gradation values of pixels which are adjacent to the interpolation pixel. This makes it possible to carry out interpolation in which an edge of the edge part is sharply emphasized and in the non-edge part, continuity of gradation is secured. Accordingly, an upscaled image having high resolution can be produced.

It is possible that: each of the plurality of upscaling process sections includes a compensation coefficient calculation section which calculates a compensation coefficient in accordance with the correlation value; and the interpolation process section carries out, on each interpolation pixel, (i) a first interpolation process for extracting an edge and (ii) a second interpolation process for obtaining continuity of gradation at all azimuths, and then the interpolation process section carries out an interpolation process on the plural pieces of divided image data in which process a result of the first interpolation process and a result of the second interpolation process are weighted in accordance with the compensation coefficient and then the weighted results are added up.

According to the configuration, the edge can be expressed clearly and an effect of noise can be appropriately reduced.

The difference operation section can carry out the difference operation process on a block of 5×5 pixels which block is centered on a target pixel.

According to the configuration, an edge can be accurately detected with the use of the correlation value which is calculated while one of the plurality of upscaling circuits does not refer to divided image data corresponding to the other one of the plurality of upscaling circuits. This makes it possible to (i) reduce size of image data used in edge detection in each of the plurality of upscaling circuits, and (ii) reduce the circuit size.

The portion included in the border areas can be image data of 2 lines or more but 5 lines or less.

According to the configuration, an edge contained in each of the plural pieces of divided image data can be accurately detected by only causing the border area to include the image data of 2 lines or more but 5 lines or less of the other one of the plural pieces of divided image data. This makes it possible to (i) reduce size of image data used in edge detection in each of the plurality of upscaling circuits, and (ii) reduce the circuit size.

A display device of the present invention includes: any one of the image processing devices described above; and a display section which displays an image which is upscaled by the image processing device.

According to the configuration, it is possible to produce and display a high-resolution image without increasing a circuit size and processing time.

An image, processing method of the present invention includes the steps of: (a) dividing inputted image data into a plural pieces of divided image data; and (b) a plurality of upscaling process sections enhancing resolution of each of the plural pieces of divided image data, respectively, in the step (a), the plural pieces of divided image data being produced so that each one of the plural pieces of divided image data shares a portion with its adjacent one of the plural pieces of divided image data, so that border areas of that one and its adjacent one of the plural pieces of divided image data overlap with each other, each of the plurality of upscaling process sections carrying out: a difference operation process in which a gradation value of a target pixel is calculated by an operation with use of differentiation or difference of gradation values in vicinity to the target pixel, the gradation value of the target pixel being used for extracting an edge of an article pictured in an image; an averaging process in which an average value of the gradation values in vicinity to the target pixel is calculated as a gradation value of the target pixel; a calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process; and an interpolation process on the plural pieces of divided image data with use of an interpolation method which is selected in accordance with the correlation value.

According to the method, each of the plurality of upscaling process sections carrying out: a difference operation process in which a gradation value of a target pixel is calculated by an operation with use of differentiation or difference of gradation values in vicinity to the target pixel, the gradation value of the target pixel being used for extracting an edge of an article pictured in an image; an averaging process in which an average value of the gradation values in vicinity to the target pixel is calculated as a gradation value of the target pixel; and a calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process. The correlation value calculated in the method is used for appropriately judging whether a vicinity to the target pixel is an edge part or non-edge part. That is, in the non-edge part, noise and thin lines, etc., other than the edge are eliminated through the averaging process, and accordingly the correlation value becomes small. On the other hand, the edge part does not change so much through the averaging process, whereby the correlation value becomes large. Therefore, with the use of the correlation value, it is possible to appropriately judge whether the vicinity of the target pixel is an edge part or a non-edge part.

Moreover, according to the method, the interpolation process is carried out on the plural pieces of divided image data with an interpolation method selected in accordance with the correlation value, and accordingly the plural pieces of divided image data is upscaled. This makes it possible to carry out respective different interpolation processes on the edge part and the non-edge part. Accordingly, a high-resolution image can be produced.

Each of the plural pieces of divided image data only needs to include gradation values in vicinity to each target pixel to be referred to in the difference operation process. Accordingly, it is not necessary to check the whole image, unlike the conventional method for edge detection. This makes it possible to (i) use a small image data for the edge detection process, (ii) reduce a circuit size, and (iii) reduce processing time.

Note that the image processing device can be realized by a computer. In that case, the computer is caused to serve as the sections described above. Accordingly, (i) a program for causing the computer to serve as the image processing device and (ii) a computer-readable storage medium storing the program are encompassed in the invention.

| Reference Signs List | |
|---|---|
| 1: | Display device |
| 2: | Liquid crystal panel |
| 10: | Image processing device |
| 11: | Dividing circuit |
| 12a through 12d: | Upscaling circuit |
| 13: | Liquid crystal driving circuit |
| 21: | Edge detection circuit |
| 22: | Interpolation circuit |
| 31: | Difference circuit |
| 32: | Filter rotation circuit |
| 33: | Direction setting circuit |
| 34: | Averaging circuit |
| 35: | Correlation operation circuit |
| 36: | Edge-distinguishing circuit |

DESCRIPTION OF EMBODIMENTS

The following describes an embodiment of the present invention.

Figure 2:
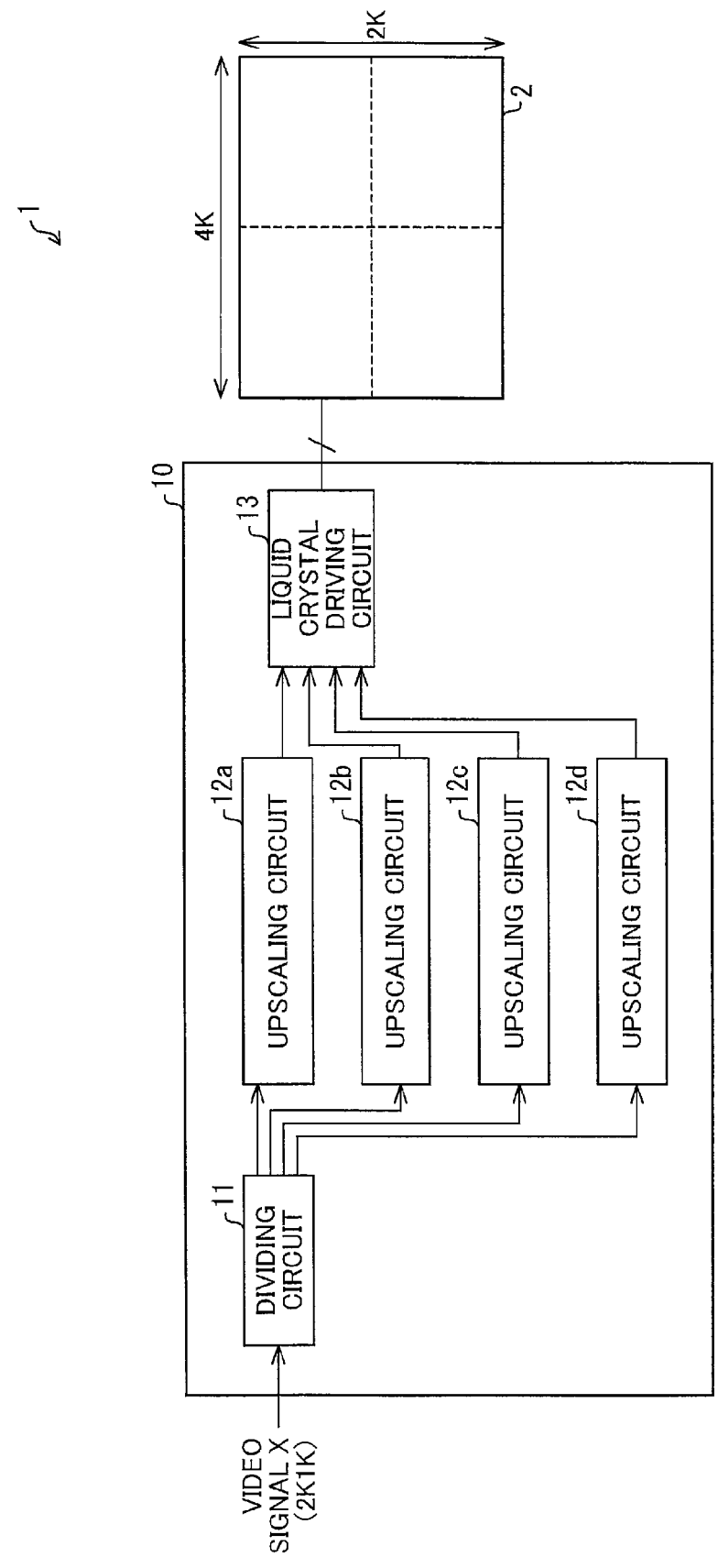
FIG. 2 is a block diagram schematically illustrating a structure of a display device including the image processing device shown in FIG. 1.

FIG. 2 is a block diagram schematically illustrating a structure of a display device 1 of the present embodiment. As shown in FIG. 2, the display device 1 includes an image processing device 10 and a liquid crystal panel (display section) 2.

The image processing device 10 includes a dividing circuit 11, upscaling circuits 12a through 12d, and a liquid crystal driving circuit (display control section) 13.

The dividing circuit 11 (i) divides image data inputted in the image processing device 10 into pieces of image data of a predetermined number of areas and then (ii) sends the pieces of divided image data to the upscaling circuits 12a through 12d, respectively.

Note that, according to the present embodiment, it is assumed that high-definition data of 2K1K class is inputted and the inputted data is divided into four pieces of image data for four areas (i.e., upper left, upper right, lower left, and lower light). However, the number of divided images and arrangement of the divided areas are not limited to this. For example, the inputted data can be divided so that the divided areas align either in a horizontal direction or in a vertical direction. A dividing method can be selected in accordance with a characteristic of the dividing method, and a circuit technology and a liquid crystal panel technology at a point in time when the dividing method is used, etc.

In the case of the present embodiment where the inputted data is divided into the four pieces of image data for the areas of upper left, upper right, lower left, and lower right, each image data of the divided area is of 2K1K. Accordingly, it is possible to use a driving method without modification which method is used in a conventional display device of 2K1K class. Moreover, a conventional signal processing circuit (signal processing LSI) which is used in a 2K1K class can be used. This provides an advantageous effect of reducing manufacturing cost and development cost.

On the other hand, in a case where the divided areas are arranged in a horizontal direction (i.e., in a case of longitudinal division; 1K2K×4 areas), or in a case where the divided areas are arranged in a vertical direction (i.e., in a case of transversal division; 4K0.5K×4 areas), the divided areas has shapes and sizes different from those of conventionally used display device. This may cause a problem in driving the display device.

In the case of the longitudinal division for example, all the divided areas are processed in an identical time series in accordance with inputted signals. This provides an advantageous effect of easily constructing signal processing logic. However, it is necessary to complete writing within a half of a conventional charging time because of the increased number of driven lines. This frequently causes a problem over reliability such as display unevenness or luminance degradation.

In the case of the transversal division, the charging time problem will not occur unlike the case of the longitudinal division. However, a problem of deterioration of panel capacitance characteristic or deterioration of aperture ratio can occur because a source line is provided across the divided areas. This frequently leads to disadvantage of basic performance of the display device.

According to the present embodiment, each of the divided areas has a border area which includes a portion of the adjacent one of the divided areas. For example, in a case where inputted image data is high-definition image data of 1920 horizontal pixels×1080 vertical pixels, the high-definition image data is divided by (960+α) pixels×(540+α) pixels, not by 960 pixels×540 pixels, so that adjacent ones of the divided areas partially overlap each other. The dividing method of an image is specifically described later.

Each of the upscaling circuits 12a through 12d (i) receives one piece of divided image data, (ii) carries out an upscaling process on the received image data, and (iii) sends the upscaled image data to the liquid crystal driving circuit 13. The upscaling process is specifically described later.

The liquid crystal driving circuit 13 controls the liquid crystal panel 2, in accordance with the upscaled image data which is sent from each of the upscaling circuits 12a through 12d, so that the liquid crystal panel 2 displays the upscaled image. Not that FIG. 2 illustrates the liquid crystal driving circuit 13 as a single block. However, the liquid crystal driving circuit 13 is not limited to this but can be made up of a plurality of blocks. For example, it is possible to (i) provide liquid crystal driving circuits 13a through 13d so as to correspond to the upscaling circuits 12a through 12d, and (ii) cause the liquid crystal driving circuits 13a through 13d to drive respective divided areas in the liquid crystal panel 2. In a case where a single liquid crystal driving circuit 13 drives the whole liquid crystal panel 2, driving timing of each of the areas can be easily driven at an identical timing. This provides an advantageous effect of easily controlling the areas. However, a circuit size (IC size) becomes large because the number of input-output pins is increased. In a case where a plurality of liquid crystal driving circuits 13 are provided for the respective divided areas, a chip size can be reduced (in particular, the present embodiment is economical because each of the divided areas is of 2K1K class, and accordingly a 2K control chip used in a conventional display device of 2K1K class can be used). However, it is necessary to provide an adjustment circuit for maintaining synchronism among the liquid crystal driving circuits.

The liquid crystal panel 2 is controlled by the liquid crystal driving circuit 13 and displays an image corresponding to image data upscaled in the image processing device 10. Note that, according to the present embodiment, the liquid crystal panel of 4096 horizontal pixels×2160 vertical pixels (i.e., 4K2K class) is used. However, display capacity of the liquid crystal panel is not limited to this.

Note that, in a case where (i) a size of image data inputted to the image processing device 10 is 1920×1080 and (ii) display size of the liquid crystal panel 2 is 4096×2160, the inputted image data is vertically and horizontally upscaled (enlarged) twice, i.e., up to 3840×2160. In this case, the transversal size (3840 dots) is smaller than that of the display size (4096 dots). Accordingly, in displaying the image, the divided images in a left half area need to be shifted toward right by 2048−1920=128 dots.

The correction process to shift the left half of the image toward right can be carried out by any component of the image processing device 10. In a case where the dividing circuit 11 corrects divided image data so that all pieces of the divided image data can be dealt with as a video of 2048×1080, it is possible to provide a general-purpose up-conversion system which can be easily applied to more kinds of video formats. Moreover, in a case where the correction is carried out by the liquid crystal driving circuit 13, it is possible to provide a general-purpose 4K2K liquid crystal display module which can be applied to many kinds of video formats. Note that in a case where displaying a 2K video is not relatively important, it is preferable to carry out the correction in a latter stage in the image processing device 10.

According to the present embodiment, the liquid crystal panel is used as the display section. However, the present invention is not limited to this. For example, a plasma display, an organic EL display, or CRT, etc. can be used as the display section. In that case, a display control section in accordance with the display section can be provided instead of the liquid crystal driving circuit 13.

Figure 3:
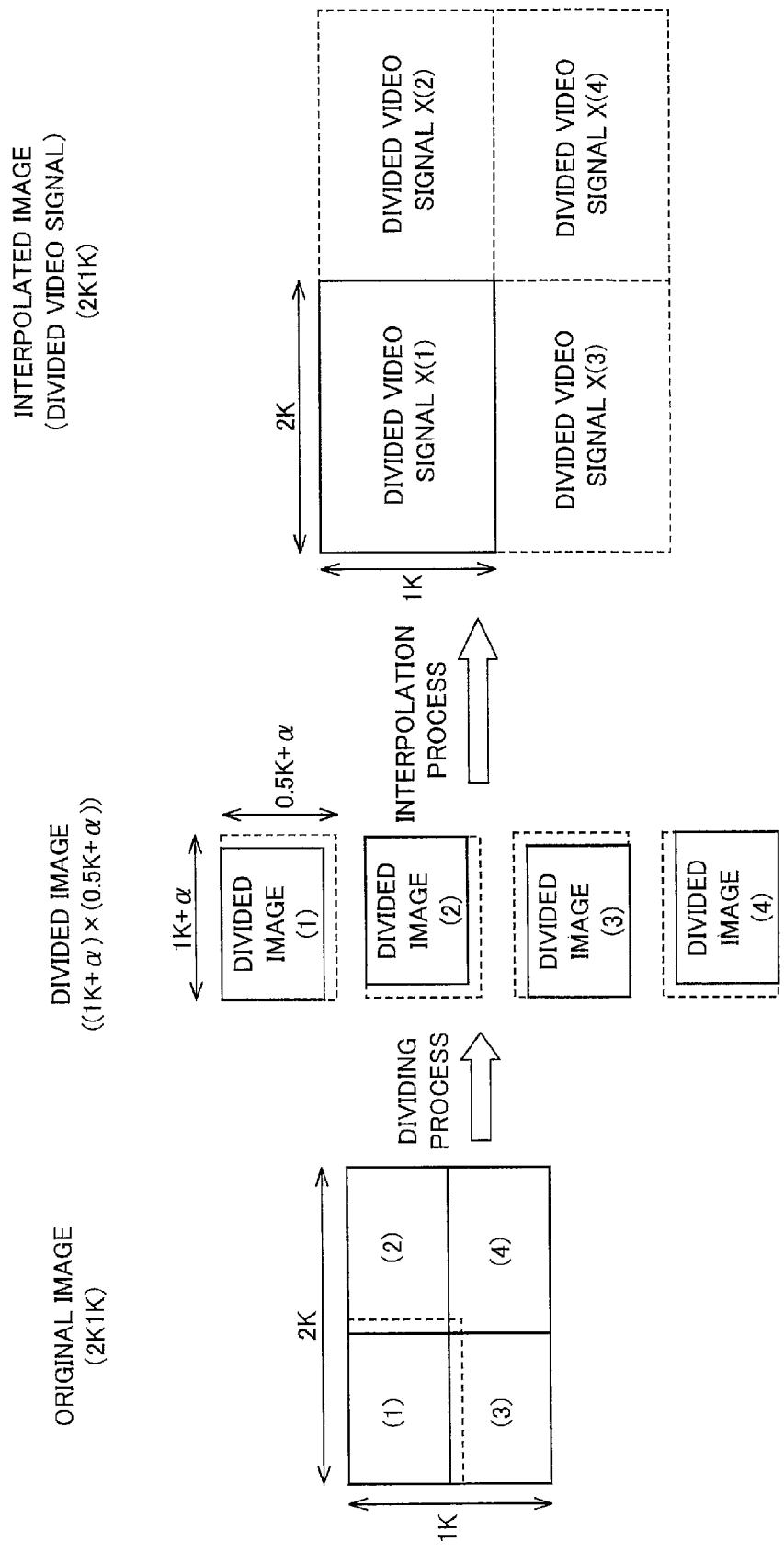
FIG. 3 is an explanatory view illustrating an overview of a process carried out by the image processing device shown in FIG. 1.

FIG. 3 is an explanatory view schematically illustrating process carried out by the display device 1 of the present embodiment. As shown in FIG. 3, when 2K1K image data is supplied, as inputted image (original image) data, to the dividing circuit 11, the dividing circuit 11 divides the inputted image data into four pieces of divided image data of (1K+α)× (0.5K+α). Note that each of dashed parts (corresponding to parts α) represents a part which overlaps the adjacent one of the divided image data.

The upscaling circuits 12a through 12d carry out interpolation processes (upscaling processes) on the respective pieces of the divided image data divided as described above, and accordingly 2K1K interpolated image data (upscaled image data) is produced. Note that each of the upscaling circuits 12a through 12d carries out the interpolation processes concurrently with the other of the upscaling circuits 12a through 12d.

Then, the liquid crystal driving circuit 13 (i) produces divided video signals corresponding to the respective pieces of the interpolated image data which are interpolated by the upscaling circuits 12a through 12d and (ii) causes the liquid crystal panel 2 to display, in the divided areas, images corresponding to the divided video signals.

Figure 4:
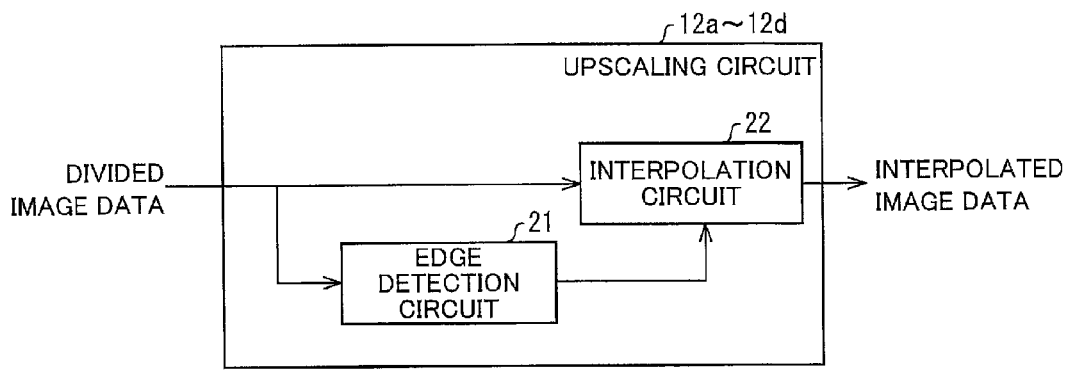
FIG. 4 is a block diagram schematically illustrating a structure of an upscaling circuit included in the image processing device shown in FIG. 1.

FIG. 4 is a block diagram schematically illustrating a structure of each of the upscaling circuits 12a through 12d. As shown in FIG. 4, each of the upscaling circuits 12a through 12d includes an edge detection circuit 21 and an interpolation circuit 22. The edge detection circuit 21 detects a position and a direction of an edge contained in divided image data. The interpolation circuit 22 carries out interpolation processes with the use of respective different interpolation methods on an edge part and a non-edge part. Specifically, the interpolation circuit 22 interpolates the edge part with the use of an average value of values of pixels which are adjacent to each other in the edge direction. On the other hand, the interpolation circuit 22 interpolates the non-edge part with the use of a weighted average value of values of pixels adjacent to each other at all azimuths.

Figure 1:
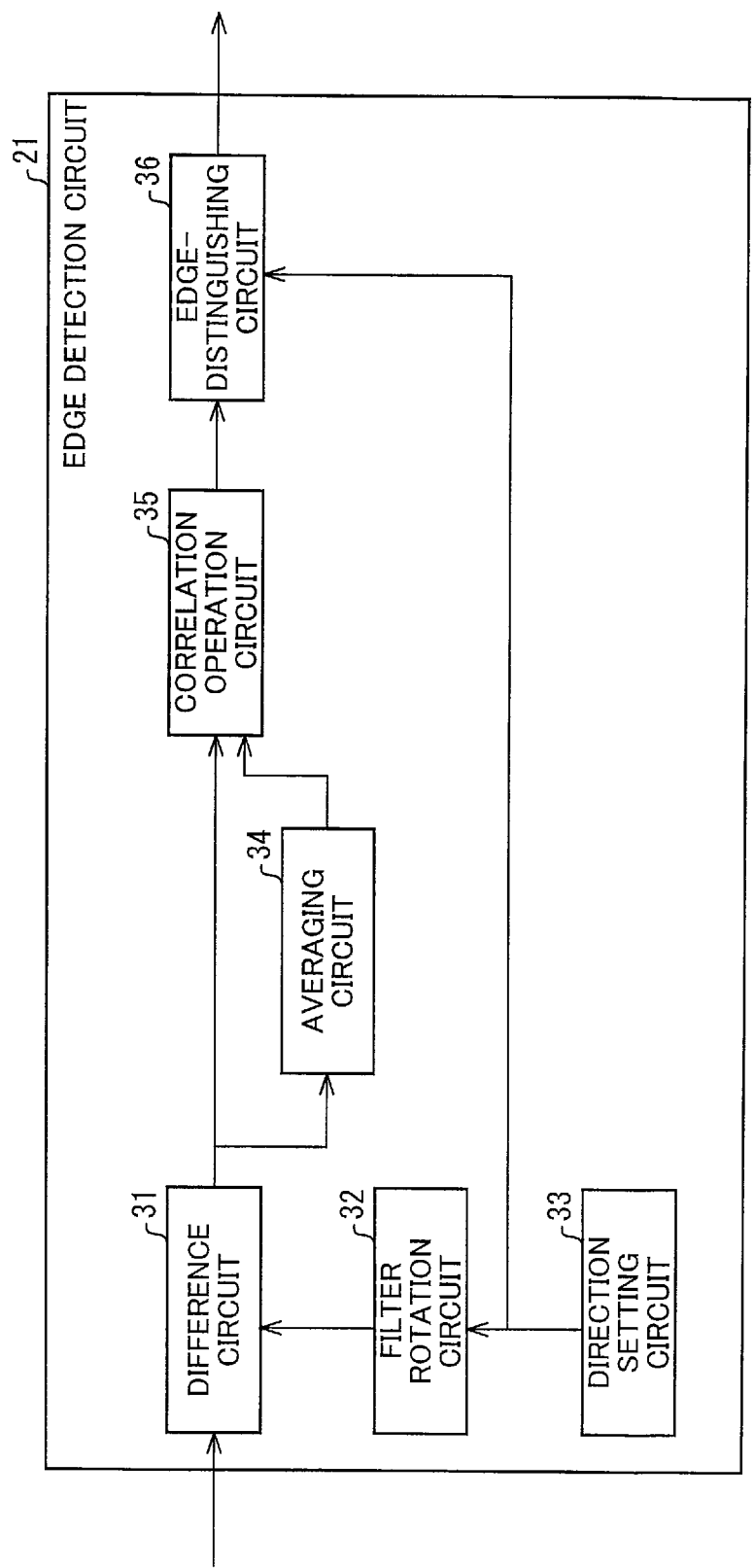
FIG. 1 is a block diagram schematically illustrating a structure of an edge detection circuit included in an image processing device, according to an embodiment of the present invention.

FIG. 1 is a block diagram schematically illustrating a configuration of the edge detection circuit 21. As shown in FIG. 1, the edge detection circuit 21 includes a difference circuit 31, a filter rotation circuit 32, a direction setting circuit 33, an averaging circuit 34, a correlation operation circuit 35, and an edge-distinguishing circuit 36.

The difference circuit 31 (i) calculates difference image data by carrying out a difference operation, with the use of a difference filter, on received image data and (ii) sends the calculated difference image data to the averaging circuit 34 and the correlation operation circuit 35.

Figure 5:
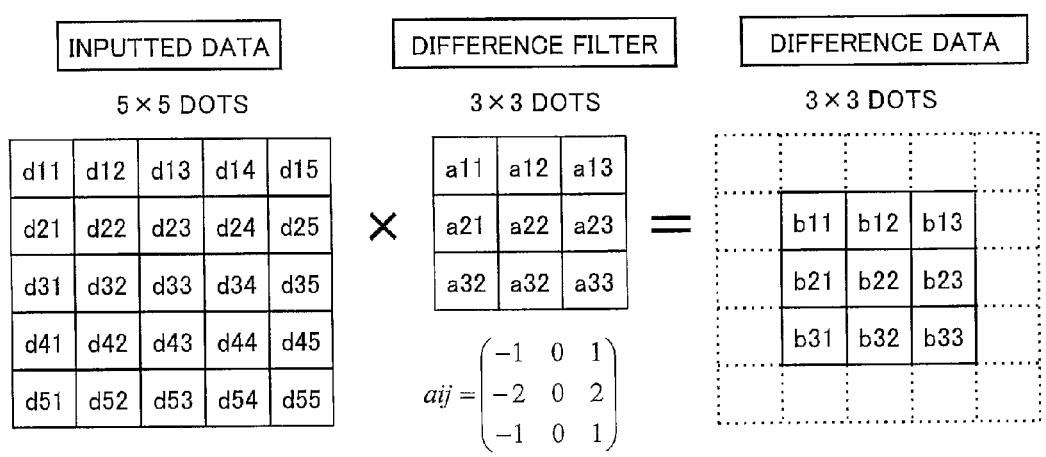
FIG. 5 is an explanatory view illustrating an overview of a difference operation process carried out in the image processing device shown in FIG. 1.

For example, as shown in FIG. 5, a difference filter made up of 3×3 dots to each of which a filter coefficient is assigned is applied to a block made up of 5×5 dots centered on a target pixel in inputted image data, whereby a difference operation result of 3×3 dots centered on the target pixel is obtained. In this case, the difference operation is represented as:

$$bkl = \sum_{i=1}^{3}\sum_{j=1}^{3} d(i+k-1)(j+l-1) \cdot aij \qquad \text{[Formula 1]}$$

where dij is a pixel value of each dot in the inputted image data (i and j are independently an integer between 1 through 3), aij is the difference filter, bkl is a pixel value of each dot in the difference operation result (k and l are independently an integer between 1 through 3).

Note that, according to the present embodiment, the difference filter aij is a filter of 1:2:1 as represented by a formula below:

$$aij = \begin{pmatrix} -1 & 0 & 1 \\ -2 & 0 & 2 \\ -1 & 0 & 1 \end{pmatrix} \qquad \text{[Formula 2]}$$

Note that the difference filter aij is not limited to this but can be a difference filter which is capable of extracting an edge of an article pictured in an image by an operation with the use of differentiation or difference of gradation values in vicinity to a target pixel. For example, such a difference filter can be a filter of 3:2:3, 1:1:1, or 1:6:1, as represented below:

$$aij = \begin{pmatrix} -3 & 0 & 3 \\ -2 & 0 & 2 \\ -3 & 0 & 3 \end{pmatrix} \quad aij = \begin{pmatrix} -1 & 0 & 1 \\ -1 & 0 & 1 \\ -1 & 0 & 1 \end{pmatrix} \quad aij = \begin{pmatrix} -1 & 0 & 1 \\ -6 & 0 & 6 \\ -1 & 0 & 1 \end{pmatrix} \quad \text{[Formula 3]}$$

In a case where a difference filter is represented as a:b:a, the larger a weight of b becomes, the more accurately a vicinity of a target pixel can be evaluated but the more easily the difference filter gets affected by noise. The smaller a weight of b becomes, the more comprehensively a vicinity of the target pixel can be judged but the more easily small change is missed. Therefore, a filter coefficient of the difference filter can be selected appropriately in accordance with a target image characteristic. For example, in a case of contents such as a photograph which is substantially precise and hardly includes a blur, a characteristic of the contents can be seen more easily as the weight of b becomes larger. In a case of contents such as a video of quick movements, in particular, a dark video which easily includes a blur or noise, it is possible to prevent misjudge by relatively reducing the weight of b. According to the present embodiment, the difference filter is made up of 3×3 dots. However, the present invention is not limited to this. For example, a difference filter of 5×5 dots or 7×7 dots can be used.

The filter rotation circuit 32 carries out a rotation process on the difference filter used in the difference circuit 31. The direction setting circuit 33 controls rotation of the difference filter by the filter rotation circuit 32 and sends, to the edge-distinguishing circuit 36, a signal indicative of an application state of the difference filter.

According to the present embodiment, inputted image data is subjected to a difference operation with the use of the difference filter aij so that edge detection process is carried out in a horizontal direction. Then, the inputted image data is subjected to a difference operation again, with the use of a filter which is obtained by rotating the difference filter aij by 90 degrees, so that an edge in a vertical direction is detected. Note that edge detection processes can be concurrently carried out in the horizontal and vertical directions. This can be carried out by providing two sets of the difference circuit 31, the filter rotation circuit 32, the direction setting circuit 33, the averaging circuit 34, the correlation operation circuit 35, and the edge-distinguishing circuit 36.

Figure 6:
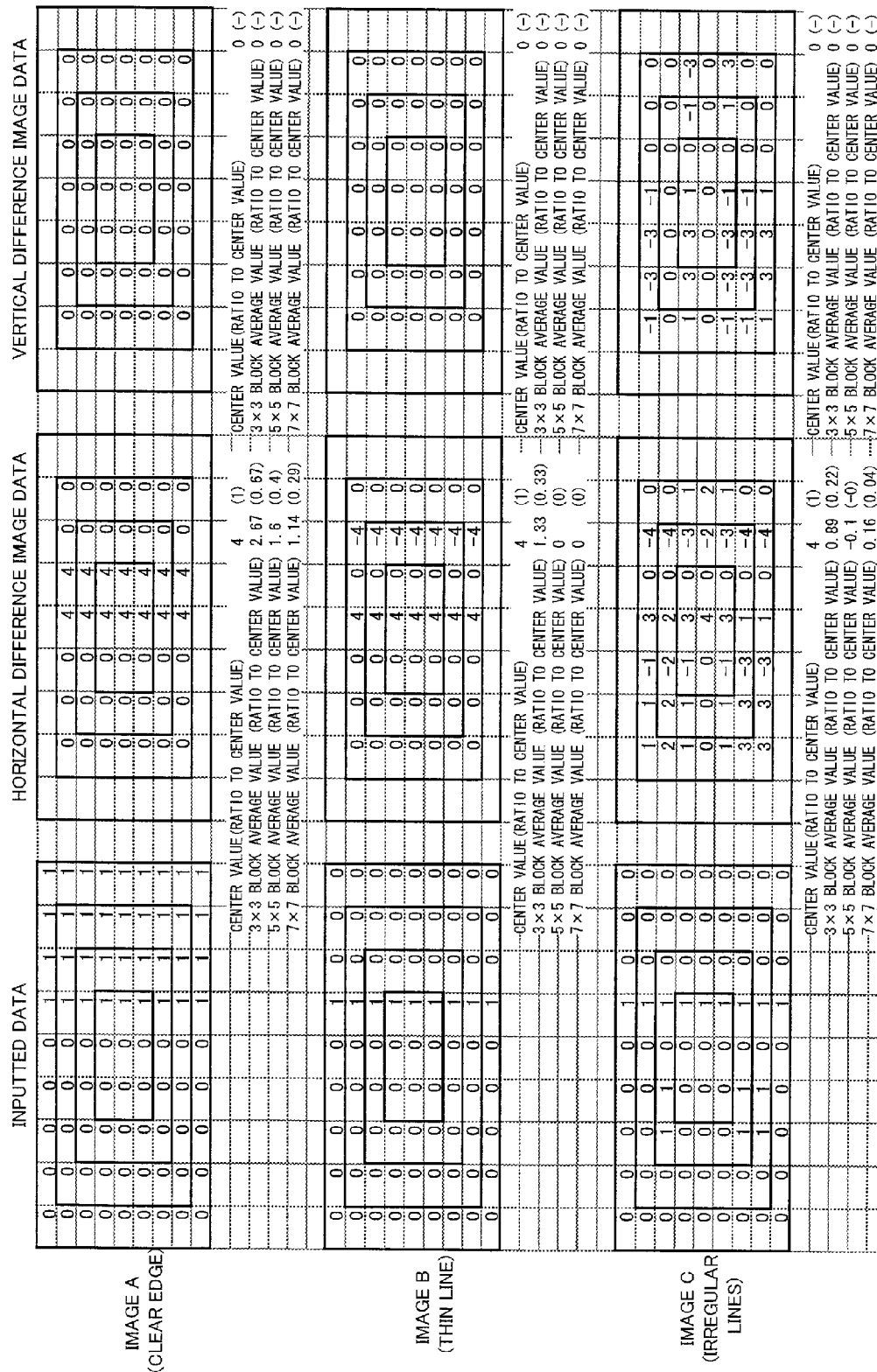
FIG. 6 is a chart illustrating an example of results of a difference operation process carried out in the image processing device shown in FIG. 1.

FIG. 6 is a chart illustrating an image (image A) of a clear edge in the vertical direction, an image (image B) of a thin line extending in the vertical direction, an image (image C) of irregular lines, and results of difference operations in the horizontal direction and the vertical direction carried out, with the use of a difference filter of 1:2:1, on the images.

As shown in FIG. 6, each of the images A through C has an identical pattern of 3×3 dots centered on a target pixel (center pixel) in inputted image data. Regarding the images A through C, each result (center value) obtained by carrying out horizontal difference operations on the respective target pixels is 4. However, each ratio between (i) an average value in the block of 3×3 dots centered on the target pixel and (ii) the center value obtained by the horizontal difference operation is: 0.67 in the picture A; 0.33 in the picture B; and 0.22 in the picture C. This indicates that the value becomes larger as the image includes a clearer edge (or a clearer image similar to an edge). That is, the image B of thin line may be either an edge or a pattern (texture), and accordingly the average value (indicative of likeness to an edge) of the image B becomes approximately half of that of the image A. Moreover, it is impossible to judge whether the image C of irregular lines is a real edge or noise, and accordingly the average value of the image C becomes approximately ⅓ of that of the image A.

Note that, in a case where the difference image data is a block of 5×5 dots or a block of 7×7 dots, differences among average values of the images A through C in the inputted image data are smaller than those of the block of 3×3 dots. Accordingly, it is necessary to carry out detailed conditional judgment in a case where edge detection is carried out with the use of the average values of the difference image data of the block of 5×5 dots or the block of 7×7 dots. Therefore, it is preferable to use the difference image data of 3×3 dots in the edge detection process. Note that the difference image data of 3×3 dots can be obtained by referring to the block of 5×5 dots in the inputted image data.

In a case where a circuit size can be enlarged, in addition to the edge detection with the use of the difference image data of 3×3 dots, edge detection process can be carried out with the used of the difference image data of 5×5 dots and/or 7×7 dots. Results of the process can be stored in a database which can be exceptionally used in a case of a detection failure in the edge detection with the use of the difference image data of 3×3 dots. This makes it possible to carry out more accurate edge detection. For example, even an edge which is mixed in a highly-repetitive texture pattern can be appropriately detected.

Figure 7:
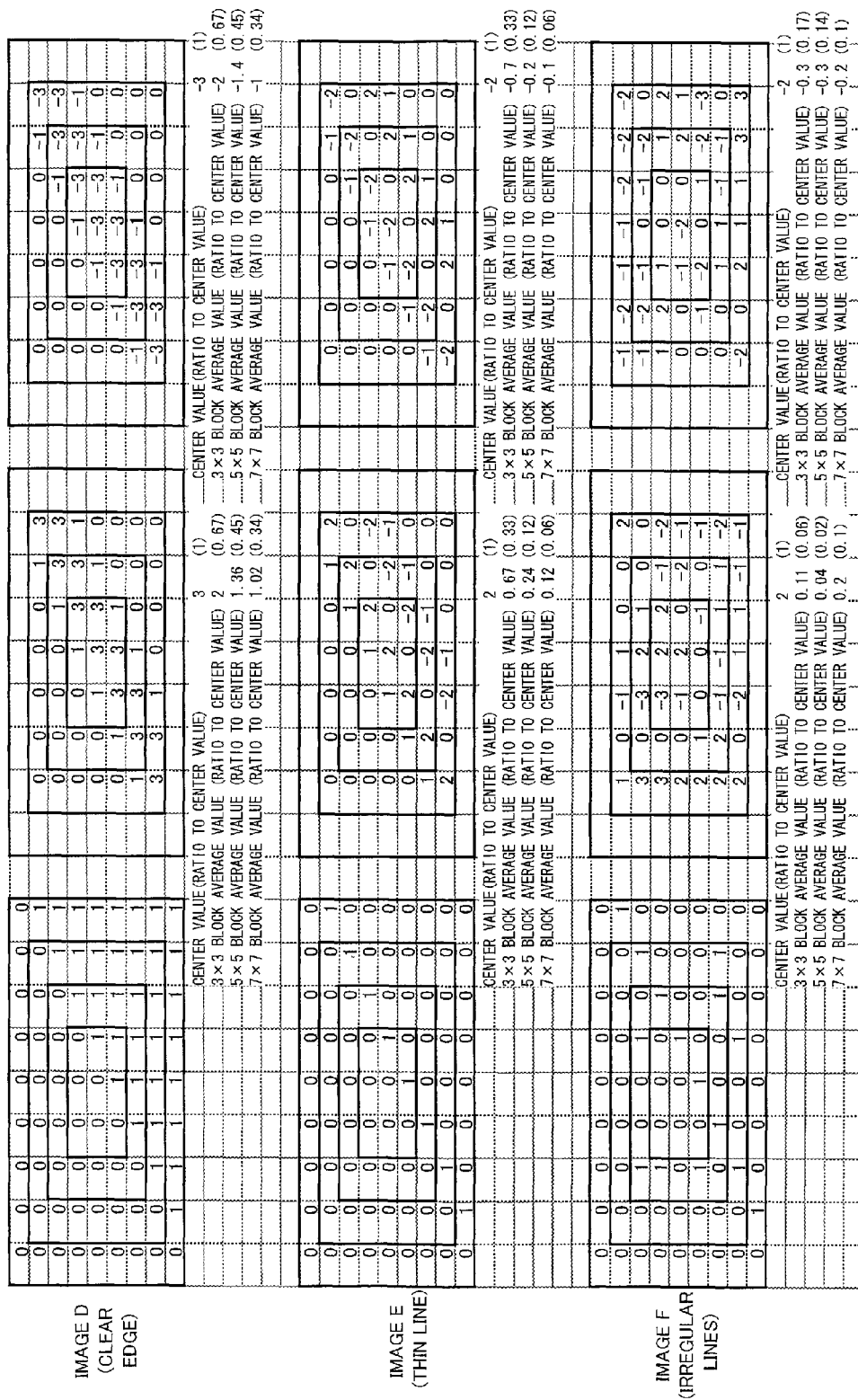
FIG. 7 is a chart illustrating an example of results of a difference operation process carried out in the image processing device shown in FIG. 1.

FIG. 7 is a chart illustrating an image (image D) of a clear edge in an oblique direction, an image (image E) of a thin line extending in an oblique direction, an image (image F) of irregular lines, and results of difference operations in the horizontal direction and the vertical direction carried out, with the use of a difference filter of 1:2:1, on the images D through F.

According to the results of horizontal and vertical difference operations carried out on the images D and E, each ratio between (i) an average value in the block of 3×3 dots centered on the target pixel and (ii) the center value is 0.67 in the picture D and 0.33 in the picture E. This indicates, as with the results of horizontal difference operation on the images A and B, that the value of the ratio becomes larger as the image expresses clearer edge (or clearer image similar to an edge). According to the image F, the ration between (i) an average value in the block of 3×3 dots and (ii) the center value is 0.06. With the ratio, it is difficult to judge the image F as an edge.

Figure 8:
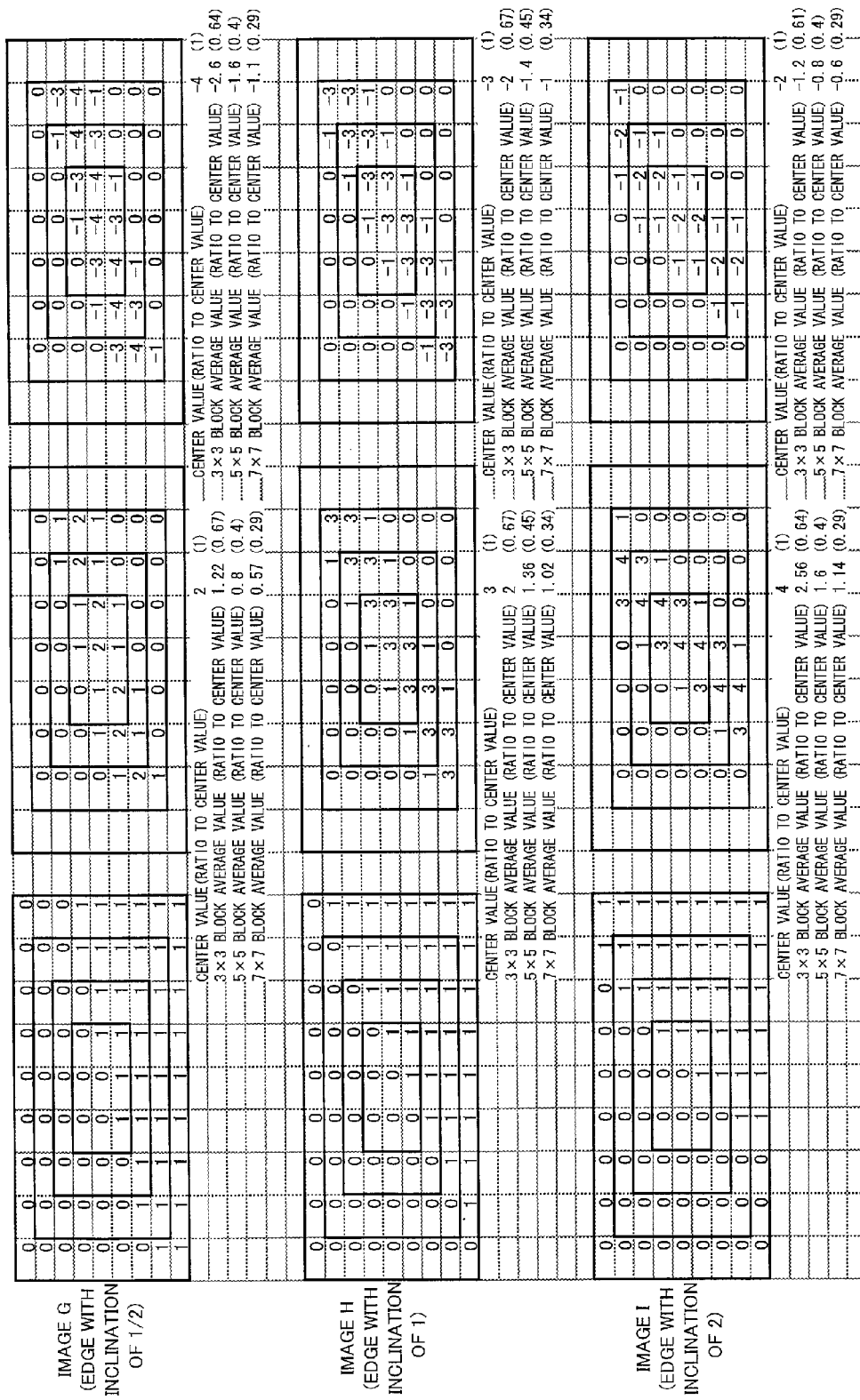
FIG. 8 is a chart illustrating an example of results of a difference operation process carried out in the image processing device shown in FIG. 1.

FIG. 8 is a chart illustrating an image (image G) of an edge with inclination of ½, an image (image H) of an edge with inclination of 1, an image (image I) of an edge with inclination of 2, and results of difference operations in the horizontal direction and the vertical direction carried out, with the use of a difference filter of 1:2:1, on the images G through I. Each of the images G through I shown in FIG. 8 represents an edge part. According to the results of horizontal and vertical difference operations carried out on the images G through I, each ratio between (i) an average value in the block of 3×3 dots centered on the target pixel and (ii) the center value is rather high.

Moreover, respective ratios between (i) the respective center values obtained by the horizontal difference operations carried out on the images G through I and (ii) the respective center values obtained by the vertical difference operations carried out on the images G through I are 2/4 in the image G, 3/3 in the image H, and 4/2 in the image I. These ratios accord with the respective inclinations of the edge in images G through I. According to the present embodiment, in a case where the edge-distinguishing circuit 36 (which is described later) judges that the target pixel is an edge part, the edge-distinguishing circuit 36 calculates, in accordance with the feature described above, an inclination of the edge based on the ratio between the center values (target pixel values) obtained by the horizontal and vertical difference operations. Note that, according to a horizontal or vertical edge, the center value obtained by the horizontal operation or the vertical operation becomes 0. This makes it possible to easily judge an edge direction.

The averaging circuit 34 produces, based on the difference image data bij supplied from the difference circuit 31, averaged image data in which a value obtained by averaging pixel values of a target pixel and the peripheral pixels is defined as a pixel value of the target pixel.

Figure 9:
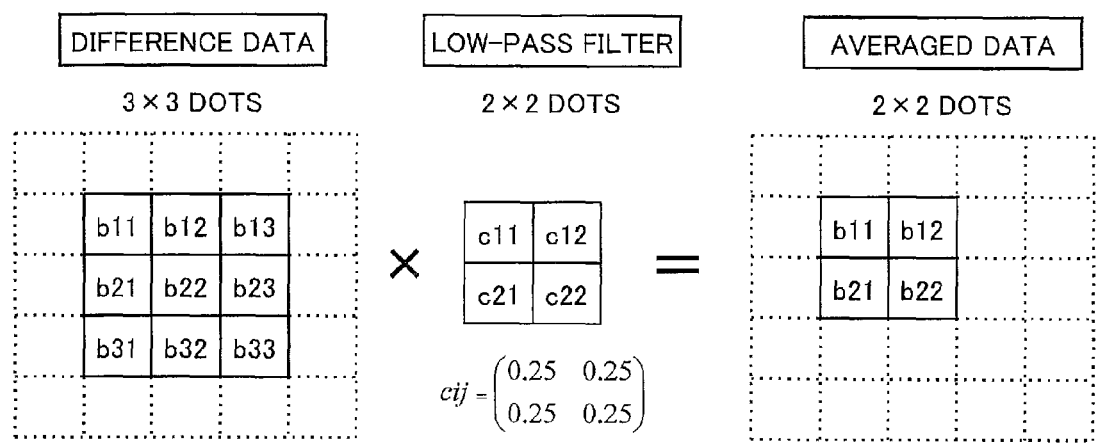
FIG. 9 is an explanatory view illustrating an overview of an averaging process carried out in the image processing device shown in FIG. 1.

Note that the averaging process can be carried out by a filter process with the use of a low-pass filter (LPF) of 2×2 dots as shown in FIG. 9 for example. According to the example shown in FIG. 9, a low-pass filter made up of 2×2 dots to each of which a filter coefficient is assigned is applied to a block made up of 3×3 dots in the difference image data sent from the difference circuit 31, whereby an averaging process result of 2×2 dots is obtained. In this case, the averaging operation is represented as:

$$b11 = \sum_{i=1}^{2}\sum_{j=1}^{2} dij \cdot aij$$ [Formula 4]

$$b12 = \sum_{i=1}^{2}\sum_{j=1}^{2} di(j+1) \cdot aij$$

$$b21 = \sum_{i=1}^{2}\sum_{j=1}^{2} d(i+1)j \cdot aij$$

$$b22 = \sum_{i=1}^{2}\sum_{j=1}^{2} d(i+1)(j+1) \cdot aij$$

where bij is a pixel value of each dot in the difference image data (i and j are independently an integer between 1 to 3), cij is the low-pass filter, and b'ij is a pixel value of each dot in the averaged image data.

Moreover, the averaging circuit 34 calculates b13, b23, b31, b32, and b33 by carrying out similar operations on each of the dots, one by one, in the block of the 3×3 dots in the difference image data. That is, the averaging circuit 34 calculates averaged image data for a total of 9 pixels including a target pixel and the surrounding 8 pixels. Then, the averaging circuit 34 sends the averaged image data of the 9 pixels to the correlation operation circuit 35.

The correlation operation circuit 35 calculates a value indicative of a correlation between the difference image data sent from the difference circuit 31 and the averaged image data sent from the averaging circuit 34. Specifically, the correlation operation circuit 35 calculates (i) an average value A of the difference image data, sent from the difference circuit 31, of 9 pixels centered on a target pixel and (ii) an average value B of the averaged image data, sent from the averaging circuit 34, of the 9 pixels centered on the target pixel. Then, the correlation operation circuit 35 carries out, based on the average values A and B, calculation processes on the target pixel for obtaining correlation values R=B/A in the horizontal and vertical directions. Subsequently, a larger one of the correlation value R calculated in the horizontal and the correlation value R calculated in the vertical directions is selected and sent to the edge-distinguishing circuit 36.

The edge-distinguishing circuit 36 compares the correlation value R of the target pixel sent from the correlation operation circuit 35 with a predetermined threshold value Th so as to judge whether or not the target pixel is an edge pixel. Note that the threshold value Th may be predetermined by carrying out an experiment in which (i) correlation values R of pixels are calculated based on a large number of sample images and (ii) a correlation value R calculated for a pixel in an edge part is compared to a correlation value R calculated for a pixel in a non-edge part.

Figure 10:
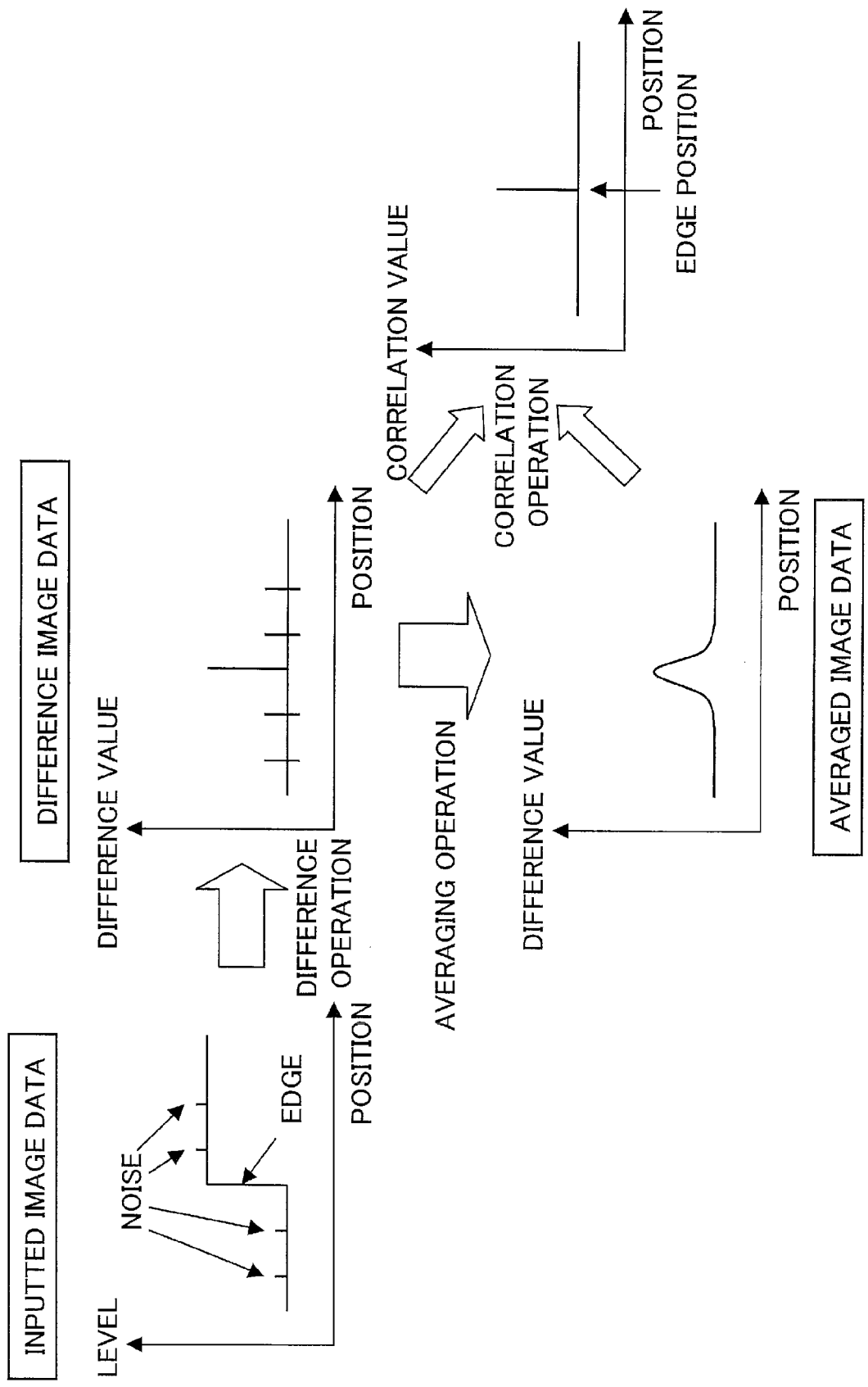
FIG. 10 is an explanatory view illustrating an overview of edge detection process carried out in the image processing device shown in FIG. 1.

FIG. 10 is an explanatory view illustrating an overview of an edge detection process carried out by the edge-distinguishing circuit 36. As shown in FIG. 10, in a case where inputted image data includes both an edge part and noise, difference image data is affected by the edge part and the noise. Accordingly, if edge detection is carried out with the use of only the difference image data, the noise will affect the edge detection.

That is, in a case where inputted image data contains an edge which extends in the longitudinal direction, difference image data which is obtained by carrying out the difference operation on the inputted image data has a value other than 0. In a case where no gradation variation exists in the inputted image data, the value becomes 0. Note however that, in a case where noise or fine vertical stripes exist, the difference image data has a value other than 0.

In view of this, the noise can be eliminated out of the difference image data by carrying out the averaging process on the difference image data (see FIG. 10).

That is, noise existing in a single dot within a range to be averaged will be eliminated by the averaging process. Moreover, it is possible to eliminate minute noise, texture, and the like by enlarging the range to be averaged, like 3×3 dots, 4×4 dots, and 5×5 dots.

On the other hand, the edge part divides relatively large areas. Accordingly, difference information before the averaging process is easily maintained in an averaged block.

According to the configuration, a correlation between the difference image data and the averaged image data which is obtained by averaging the difference image data is checked. This makes it possible to accurately detect an edge part while distinguishing noise or a texture from the edge.

That is, in the averaged image data, noise or a texture are eliminated while the edge part remains after the averaging process. Accordingly, the correlation value R becomes large in the edge part whereas the correlation value R becomes small in the non-edge part. Moreover, the correlation value R is 1 or a value close to 1 in the edge part whereas the correlation value R in the non-edge part is far smaller than the correlation value in the edge part. Therefore, it is possible to highly accurately detect an edge part by (i) checking, by an experiment, etc. in advance, a range in which the correlation value drastically changes and (ii) predetermining a threshold value Th within the range.

The edge-distinguishing circuit 36 (i) detects an edge direction (a direction in which the edge extends) with the use of the result of the horizontal difference operation process and the result of the vertical difference operation process and (ii) sends the detected result to the interpolation circuit 22.

Specifically, the edge-distinguishing circuit 36 calculates a ratio a=a1/a2, where a1 is a value of a target pixel in the horizontal difference operation result and a2 is a value of a target pixel in the vertical difference operation result. Then, with the use of the calculated ratio a, an inclined angle θ of the edge is calculated by θ=arctan(a).

Figure 11:
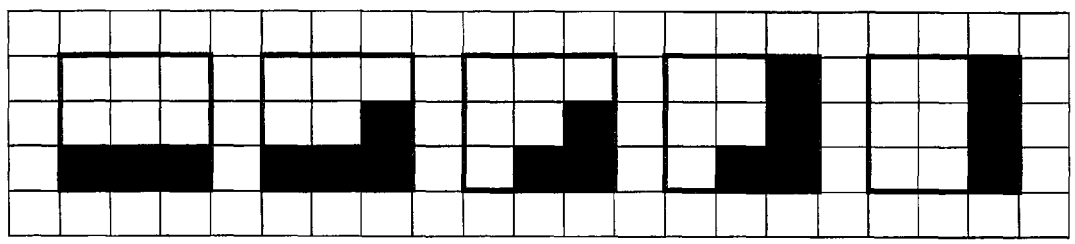
FIG. 11 is an explanatory view illustrating patterns of inclination of an edge expressed by a block of 3×3 dots, according to the image processing device shown in FIG. 1.

Note that patterns (types) of inclination which can be expressed by a block of 3×3 dots are only 5 types (see FIG. 11). Moreover, in some cases, a value of the ratio a changes due to an effect of noise contained in the inputted image data. Accordingly, it is not necessarily required to exactly calculate the angle θ of the edge direction. That is, it is sufficient as long as the angle θ can be classified into any one of the 5 patterns shown in FIG. 11 or any one of 9 patterns including the 5 patterns shown in FIG. 11 and intermediate inclinations of the 5 patterns. Therefore, it is not necessarily required to directly calculate the value of the ratio a in order to (i) simplify an edge detection process and (ii) reduce a circuit size required for detecting an edge direction. For example, the inclination of the edge can be classified, by comparing with a multiplication circuit, into any one of the 5 patterns shown in FIG. 11 or any one of the 9 patterns including the 5 patterns shown in FIG. 11 and intermediate inclinations of the 5 patterns.

Alternatively, a filter of 5×5 dots can be used for detecting an inclination of an edge direction. Patterns of inclination which can be judged in an area of 5×5 dots are 9 types of simple patterns or a dozen of types of patterns when intermediate inclinations of the 9 types are considered. Therefore, when the filter of 5×5 dots is used for judging an edge direction more accurately and an interpolation operation is carried out in accordance with the inclination patterns judged by the filter of 5×5 dots, an edge state can be interpolated appropriately within a larger area, as compared with the case where an inclination is judged by the block of 3×3 dots. However, in a case where a block of 5×5 dots is used for detecting an edge direction, an edge whose direction changes in a short cycle tends to be missed more often than the case where the block of 3×3 dots is used for detection. Therefore, the blocks for detecting inclination of an edge direction can be selected appropriately in accordance with a type or characteristic, etc. of contents to be displayed.

Based on the result of edge detection carried out by the edge-distinguishing circuit 36, the interpolation circuit 22 carries out interpolation processes, on the edge part and the non-edge part, which are suitable for respective characteristics of the edge part and the non-edge part.

Figure 12:
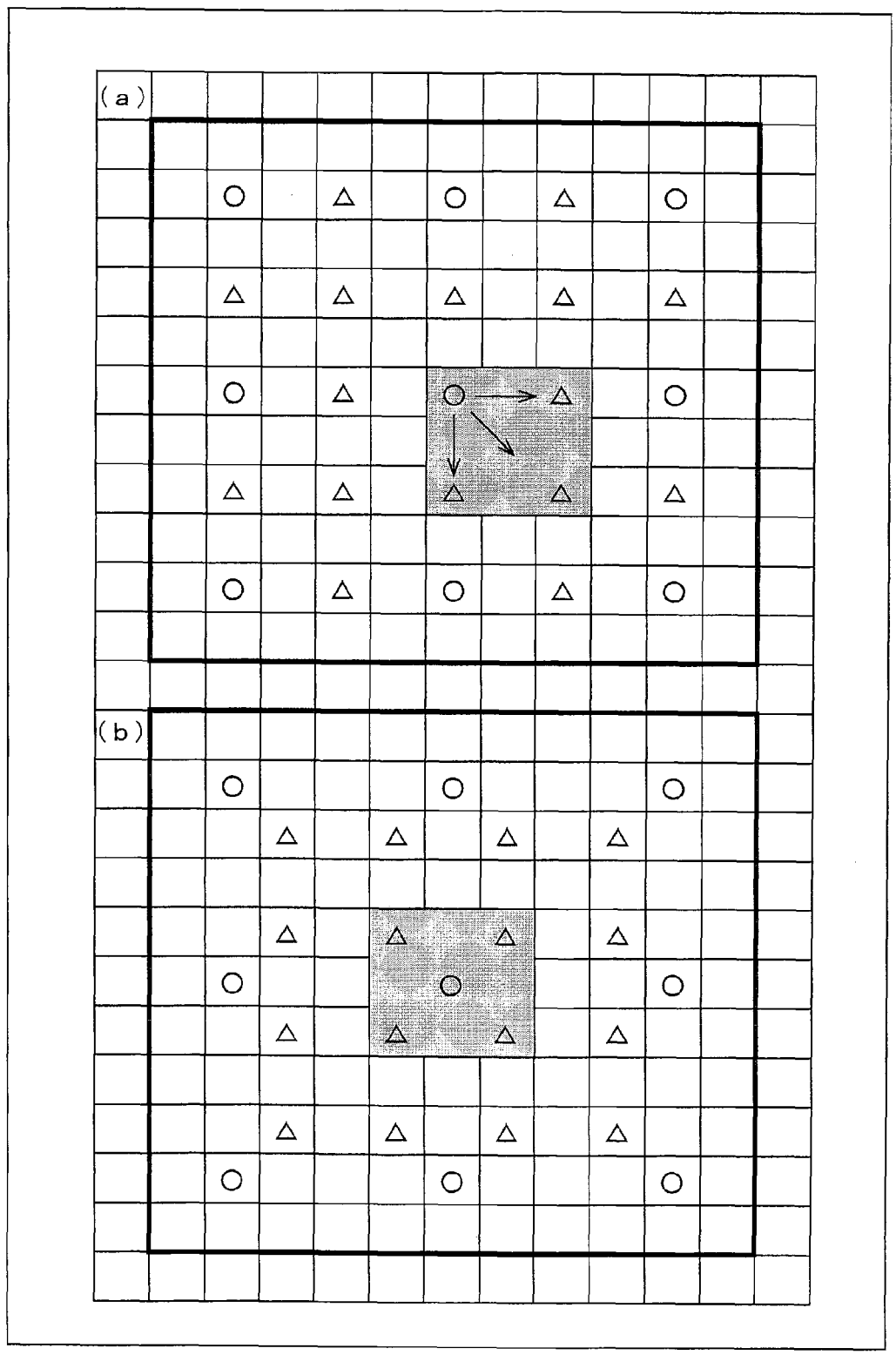
FIG. 12 is an explanatory view illustrating examples of an interpolation method used in an upscaling process.

Note that, in a case where inputted image data is upscaled by horizontally and vertically doubling resolution of the inputted image data, two types of interpolation methods can be used (see (a) and (b) of FIG. 12).

As shown in (a) of FIG. 12, according to a first method, pixels (indicated by triangles in the figure) between reference pixels (indicated by circles in the figure) in the inputted image data are interpolated while values (luminance) of the reference pixels remain.

As shown in (b) of FIG. 12, according to a second method, four pixels (indicated by triangles in the figure) surrounding each of reference pixels (indicated by circles in the figure) in the inputted image data are interpolated. According to this method, pixel values (luminance) of the reference pixels do not remain after the interpolation process.

In a case where an inputted image expresses an article having a clear edge and the second method is used for interpolation, the edge may be blurred because pixel values of reference pixels do not remain in the inputted image data. The first method can be carried out by an operation which is easier than that of the second method, whereby a circuit size can be reduced. Therefore, the present embodiment employs the first method. However, the present invention is not limited to this but the second method can be used.

Figure 13:
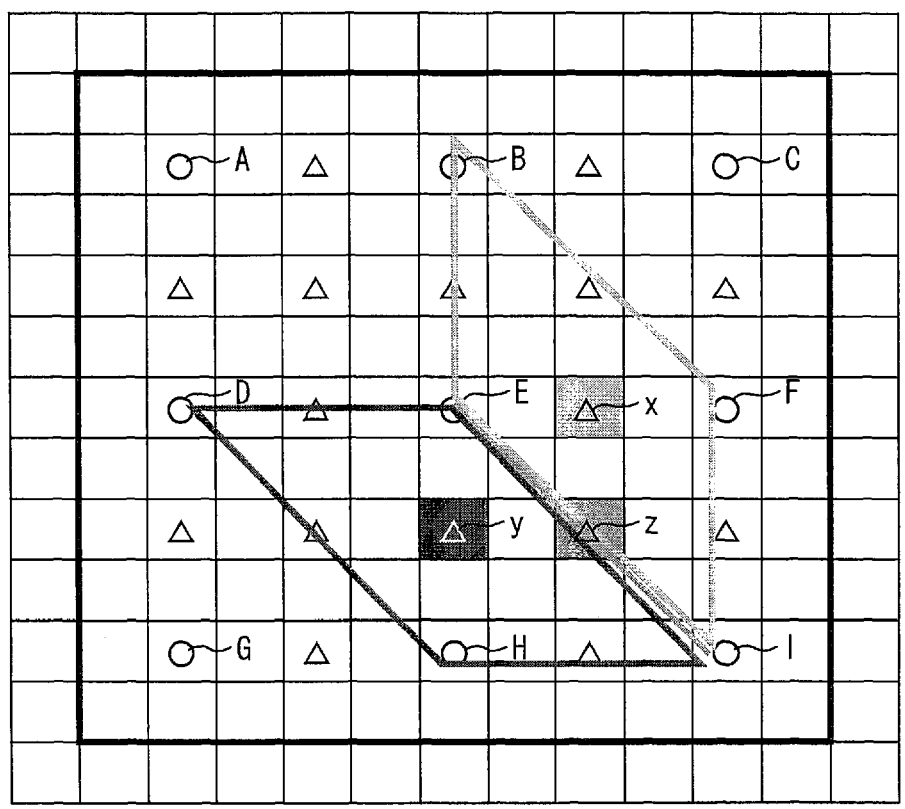
FIG. 13 is an explanatory view illustrating an example of an interpolation method applied to an edge part, according to the image processing device shown in FIG. 1.

FIG. 13 is an explanatory view illustrating an interpolation method applied to an edge part, where an edge part having an inclination of 1 is interpolated for example.

According to the interpolation method shown in FIG. 13, first, four pixels which surround a pixel to be interpolated are selected. Not that an interpolation operation can be easily carried out when four pixels are selected which are positioned at respective apexes of a parallelogram formed by lines including lines in parallel with the inclination direction of the edge.

Specifically, as shown in FIG. 13, pixels B, E, F, and I are selected as pixels surrounding an interpolation pixel x. Moreover, pixels D, E, H, and I are selected as pixels surrounding an interpolation pixel y. Note that, for an interpolation pixel z which exists on a line which connects pixels adjacent to each other in the edge direction, the pixels (in this case, two pixels) adjacent to each other in the edge direction are selected as pixels surrounding the interpolation pixel z. Then, an average value of the selected surrounding pixels is obtained as a pixel value of corresponding one of the interpolation pixels. That is, $z=(E+I)/2$, $y=(D+E+H+I)/4$, and $x=(B+E+F+I)/4$.

Note that, in a case where inclination of an edge direction is not 1, an average value can be used which is obtained by multiplying each pixel value of surrounding four pixels by a coefficient which is set for each pixel in accordance with a degree of inclination. For example, in a case where an inclination is 2 in FIG. 13, the pixel values of the interpolation pixels can be obtained as follows: $z=((3\times E+F)/4+(H+3\times I))/2$, $y=((3\times E+D)/4+(3\times H+I)/4)/2$, $x=(B+I)/2$.

The coefficient in accordance with the inclination of the edge can be set in advance by an approximate calculation, etc. so as to correspond to, for example, the 5 patterns or the 9 patterns which can be expressed by the block of 3×3 dots.

On the other hand, a part which is judged to be a non-edge part (e.g., a part expressing gentle gradation variations or a noise part) is processed by an interpolation method effective for a texture in which an edge does not stand out. The method "effective for a texture" means a process which is (i) centered on maintainability of gradation or hue, and continuity of gradation variations and (ii) relatively effective against noise. Such a method can be, for example, conventionally known various methods such as a bilinear method, a bicubic method, or a lanczos filter method (LANCZOS method). In particular, the LANCZOS method is known as an excellent and simple filter which can be used suitably in a case where an enhancing rate in upscaling is constant (in the present embodiment, resolution is doubled).

As described above, according to the image processing device 10 of the present embodiment, a correlation value is calculated with the use of (i) difference image data which is obtained by carrying out the difference operation on the inputted image data and (ii) averaged image data which is obtained by carrying out the averaging process on the difference image data, and then an edge part and an edge direction are detected based on the calculated correlation value. This makes it possible to highly-accurately detect an edge part in the inputted image data.

Moreover, according to the present embodiment, it is judged whether or not a target pixel in inputted image data is an edge part based on difference image data and averaged image data which are calculated based on image data of 5×5 dots centered on the target pixel. According to the configuration, when the inputted image data is divided for a plurality of areas, the inputted image data is simply divided into four pieces of divided image data, and each one of the four pieces of divided image data is caused to include image data of 2 nearest lines of dots in each border area of the adjacent ones of the divided areas, the nearest lines being nearest to that one of the divided areas. That is, image data of 2 columns in a border area of the horizontally adjacent divided image data and image data of 2 rows in a border area of the vertically adjacent divided image data are added to (overlap) each one of the four pieces of divided image data. This makes it possible to highly-accurately detect an edge part contained in each piece of the divided image data. That is, it is possible to accurately and separately carry out edge detection and upscaling on each of the divided areas without considering interaction with the other divided areas, by causing each of the divided areas to have a horizontal pixel number of nx/2+2 and a vertical pixel number of ny+2, where nx and ny indicate the horizontal pixel number and the vertical pixel number, respectively, in the inputted image data.

According to the configuration, image data used for an edge detection process can be reduced. This makes it possible to reduce a circuit size and processing time. That is, it is not necessary to check an edge of an article pictured in the whole image, unlike the conventional technique. Accordingly, it is not necessary to send, for edge detection, information of the whole image to each of divided upscaling circuits. Therefore, it is possible to highly-accurately carry out, in each of the upscaling circuits, edge detection without considering interaction with the other divided areas.

According to the present embodiment, edge detection processes are concurrently carried out on respective pieces of the divided image data. This makes it possible to further reduce time taken for edge detection on the whole image.

Note that, according to the present embodiment, it is judged whether or not a target pixel in inputted image data is an edge part based on difference image data (difference image data of 3×3 dots) and averaged image data (averaged image data of 3×3 dots) which are calculated in image data of 5×5 dots centered on the target pixel. However, a size of a block which is referred to in edge detection is not limited to this.

When edge detection is carried out with the use of blocks to be referred to which have respective different sizes, edge detection accuracy is increased as the size of the block increases up to 5×5 dots, whereas the edge detection accuracy is hardly changed except for slight increase in the case of blocks larger than 5×5 dots. From this, it has found that sufficient edge detection accuracy can be obtained by referring to a block of 5×5 dots.

This may be because, as a size of a block to be referred to becomes larger, noise and texture can be eliminated by an averaging process more easily, and most of noise and texture can be eliminated by referring to a block having a size of 5×5 dots. As a size of a block to be referred to becomes larger, an amount of data becomes larger which data is to be added to (which data is to overlap) each of divided areas for which inputted image data is divided. Therefore, it is preferable that a size of a block to be referred to is 5×5 dots.

Note that, in a case where the size of the block to be referred to is 5×5 dots, each size of the difference image data and the averaged image data is set to 3×3 dots. In view of symmetric property with respect to a target pixel, the dot number to be added to (overlapped with) each piece of the divided image data is set to 2 dots ($\alpha$=2 in the above described formula).

However, according to a current video technology, a counter used in dividing inputted image data can malfunction due to incorrect timing of a video signal. In view of this, it is preferable to add a margin of several dots (e.g., 1 to 3 dots) to the theoretically added dot number. The addition of the margin makes it possible to use data corresponding to the margin when, for example, interpolation methods for a non-edge part is switched in accordance with types of video, or when an edge direction is to be detected more precisely.

According to the present embodiment, the edge detection is carried out with the use of an average value in 9 dots (i.e., 3×3 dots) of the difference image data and averaged image data. However, the present invention is not limited to this. For example, edge detection can be carried out with the use of an average value of 8 dots which is surrounding the target pixel in the 3×3 dots which constitute each of the difference image data and the averaged image data. Even in this case, it is possible to obtain, by changing parameters in accordance with the configuration, edge detection accuracy similar to that of the case where the average value of 9 dots is used.

Figure 14:
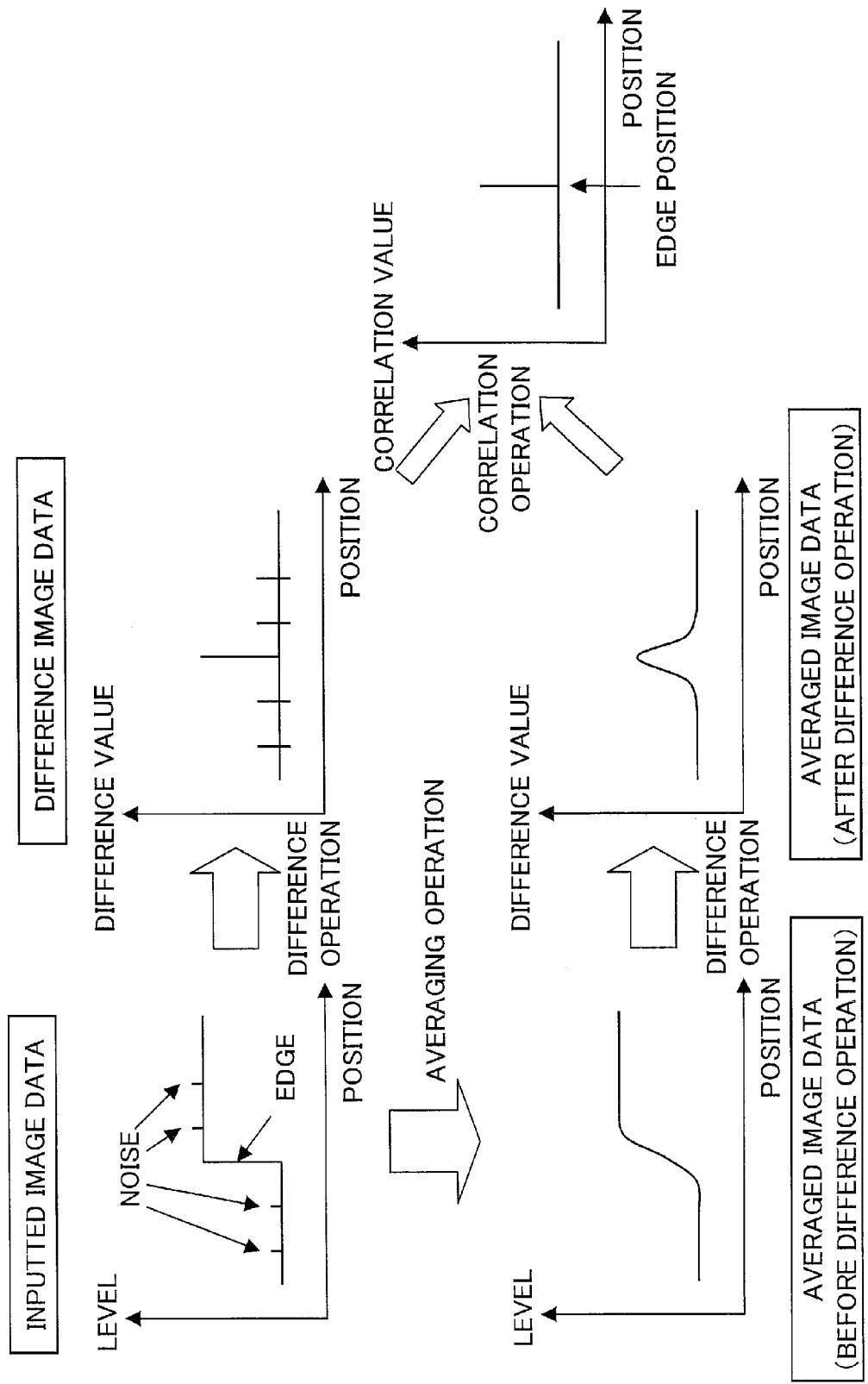
FIG. 14 is an explanatory view illustrating a modification of an edge detection process carried out in the image processing device shown in FIG. 1.

According to the present embodiment, the averaging process is carried out on the difference image data calculated by the difference operation. However, the present invention is not limited to this. For example, as shown in FIG. 14, it is possible to calculate averaged image data by carrying out the averaging process on inputted image data and then carrying out a difference operation on the image data which has been subjected to the averaging process. In this case also, it is possible to obtain an effect which is similar to that in the case where the averaging process is carried out on the difference image data calculated by the difference operation.

According to the present embodiment, only a single difference circuit 33 is provided in each of the upscaling circuits 12*a* through 12*d*. However, the present invention is not limited to this. For example, (i) a difference circuit for producing difference image data to be sent to the correlation operation circuit 35 and (ii) a difference circuit for producing difference image data to be sent to the averaging circuit 34 (or a difference circuit which carries out a difference operation on the averaged image data sent from the averaging circuit 34) can be provided separately in each of the upscaling circuits 12*a* through 12*d*.

According to the present embodiment, it is judged whether each of the interpolation pixels is an edge part or a non-edge part, and interpolation is carried out with an interpolation method selected in accordance with the judgment result. However, it is not necessarily required to clearly distinguish the interpolation pixel according to the 2 types.

For example, it is possible that: edge parameters are produced by dividing a value which can be the correlation value R; an interpolation value calculated by an interpolation method for an edge part and an interpolation value calculated by an interpolation method for a non-edge part are weighted in accordance with the edge parameters; and a pixel value of the interpolation pixel is calculated by adding up the weighted values. That is, the interpolation value calculated by the interpolation method for an edge part and the interpolation value calculated by the interpolation method for a non-edge part can be combined with a ratio in accordance with a degree of likeness to an edge. This makes it possible to realize the upscaling circuit having a small circuit size with which upscaling circuit (i) an edge of an article pictured in an image can be clearly expressed and (ii) an effect of noise can be reduced.

Specifically, for example, a value (0 to 1) which can be the correlation value R is divided into 16 divided ranges, an edge parameter (compensation coefficient) $\beta$ is assigned to each of the divided ranges, and the edge-distinguishing circuit (compensation coefficient calculation section) 36 or the other circuit (compensation coefficient calculation section) determines an edge parameter $\beta$ which corresponds to a correlation value R calculated based on divided image data. Then, the interpolation circuit 22 calculates a definitive pixel value p of the interpolation pixel by $p=\beta \times p1+(1-\beta) \times p2$, where p1 is a interpolation value calculated by the interpolation method for an edge part and p2 is an interpolation value calculated by the interpolation method (e.g., a LANCZOS method) for non-edge part. Note that, as shown in FIG. 6 through 8, a ratio between the value of the target pixel obtained by the difference operation for the clear edge part and the average value of 3×3 dots is 0.67. Accordingly, a divided range containing a maximum value can be set to, for example, approximately 0.7 to 1, and an edge parameter β corresponding to the divided range can be set to 1. Moreover, the number of values to be divided from the value which can be the correlation value R is not limited to 16. For example, the number can be approximately 8.

Each of the circuits (each block) included in the image processing device 10 can be realized by software with the use of a processor such as a CPU. That is, the image processing device 10 can include a CPU (central processing unit), a ROM (read only memory), a RAM (random access memory), and a memory device (memory medium) such as a memory. The CPU executes instructions in control programs for realizing each function. The ROM contains the program which is loaded on the RAM, and the memory device stores the program and various data. The objective of the present invention can also be achieved, by providing the image processing device 10 with a computer-readable storage medium storing control program codes (executable program, intermediate code program, or source program) for the image processing device 10, serving as software for realizing the foregoing respective functions, so that the computer (or CPU or MPU) retrieves and executes the program code stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the image processing device 10 can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

Each of the circuits (each block) included in the image processing device 10 can be realized by any of (i) software, (ii) hardware logic, and (iii) a combination of hardware which carries out part of a process and a operation means which executes software for carrying out control of the hardware and the rest of the process.

The present invention is not limited to the description of the embodiments above, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention can be used in an image processing device and an image processing method for upscaling inputted image data so that the inputted image data has enhanced resolution.

The invention claimed is:
1. An image processing device comprising:
a dividing process section which divides inputted image data into a plural pieces of divided image data; and
a plurality of upscaling process sections which enhance resolution of each of the plural pieces of divided image data, respectively, wherein the dividing process section producing the plural pieces of divided image data so that each one of the plural pieces of divided image data shares a portion with its adjacent one of the plural pieces of divided image data, so that border areas of that one and its adjacent one of the plural pieces of divided image data overlap each other,
each of the plurality of upscaling process sections including:
a difference operation section which carries out a difference operation process in which a gradation value of a target pixel is calculated by an operation with use of differentiation or difference of gradation values in vicinity to the target pixel, the gradation value of the target pixel being used for extracting an edge of an article pictured in an image,
an averaging process section which carries out an averaging process in which an average value of the gradation values in vicinity to the target pixel is calculated as a gradation value of the target pixel;
a correlation operation section which carries out calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process;
an interpolation process section which carries out an interpolation process on the plural pieces of divided image data with use of an interpolation method which is selected in accordance with the correlation value;
each of the plurality of upscaling process sections includes an edge-distinguishing section which distinguishes, by comparing the correlation value in each pixel with a predetermined threshold value, an edge part from a non-edge part contained in each of the plural pieces of divided image data;
the interpolation process section carries out the interpolation process on the edge part with an interpolation method with which the edge part stands out more than the non-edge part; and
the difference operation section carries out (i) a horizontal difference operation process for extracting a horizontal edge contained in each of the plural pieces of divided image data and (ii) a vertical difference operation process for extracting a vertical edge contained in each of the plural pieces of divided image data;
when a target pixel is judged as an edge part, the edge-distinguishing section calculates an inclined angle of the edge, the inclined angle of edge being a ratio between a gradation value of a target pixel after the horizontal difference operation process and a gradation value of the target pixel after the vertical difference operation process;
the interpolation process section carries out interpolation process on an interpolation pixel in the edge part with use of gradation values of pixels which are adjacent to the interpolation pixel and selected in the order of distance from a straight line which passes through the inter- polation pixel and extends in parallel with an inclining direction of the edge, the number of the pixels to be selected being equal to or smaller than a predetermined number; and the interpolation process section carries out interpolation process on an interpolation pixel in the non-edge part with use of gradation values of pixels which are adjacent to the interpolation pixel.

2. The image processing device as set forth in claim 1, wherein:

each of the plurality of upscaling process sections carries out the difference operation process, the averaging process, the calculation process of the correlation value, and the interpolation process, concurrently with the other of the plurality of upscaling process sections.

3. The image processing device as set forth in claim 1, wherein:

the difference operation section carries out the difference operation process on a block of 5×5 pixels which block is centered on a target pixel.

4. The image processing device as set forth in claim 1, wherein:

the portion included in the border areas is image data of 2 lines or more but 5 lines or less.

5. An image processing device comprising:

a dividing process section which divides inputted image data into a plural pieces of divided image data; and a plurality of upscaling process sections which enhance resolution of each of the plural pieces of divided image data, respectively, wherein the dividing process section producing the plural pieces of divided image data so that each one of the plural pieces of divided image data shares a portion with its adjacent one of the plural pieces of divided image data, so that border areas of that one and its adjacent one of the plural pieces of divided image data overlap each other, each of the plurality of upscaling process sections including:

a difference operation section which carries out a difference operation process in which a gradation value of a target pixel is calculated by an operation with use of differentiation or difference of gradation values in vicinity to the target pixel, the gradation value of the target pixel being used for extracting an edge of an article pictured in an image, an averaging process section which carries out an averaging process in which an average value of the gradation values in vicinity to the target pixel is calculated as a gradation value of the target pixel;

a correlation operation section which carries out calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process; and an interpolation process section which carries out an interpolation process on the plural pieces of divided image data with use of an interpolation method which is selected in accordance with the correlation value;

each of the plurality of upscaling process sections includes a compensation coefficient calculation section which calculates a compensation coefficient in accordance with the correlation value; and the interpolation process section carries out, on each interpolation pixel, (i) a first interpolation process for extracting an edge and (ii) a second interpolation process for obtaining continuity of gradation at all azimuths, and then the interpolation process section carries out an interpolation process on the plural pieces of divided image data in which process a result of the first interpolation process and a result of the second interpolation process are weighted in accordance with the compensation coefficient and then the weighted results are added up.

6. A display device comprising:

an image processing device comprising:

a dividing process section which divides inputted image data into a plural pieces of divided image data; and a plurality of upscaling process sections which enhance resolution of each of the plural pieces of divided image data, respectively; wherein the dividing process section producing the plural pieces of divided image data so that each one of the plural pieces of divided image data shares a portion with its adjacent one of the plural pieces of divided image data, so that border areas of that one and its adjacent one of the plural pieces of divided image data overlap each other;

each of the plurality of upscaling process sections including:

a difference operation section which carries out a difference operation process in which a gradation value of a target pixel is calculated by an operation with use of differentiation or difference of gradation values in vicinity to the target pixel, the gradation value of the target pixel being used for extracting an edge of an article pictured in an image;

an averaging process section which carries out an averaging process in which an average value of the gradation values in vicinity to the target pixel is calculated as a gradation value of the target pixel;

a correlation operation section which carries out calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process;

an interpolation process section which carries out an interpolation process on the plural pieces of divided image data with use of an interpolation method which is selected in accordance with the correlation value;

each of the plurality of upscaling process sections includes an edge-distinguishing section which distinguishes, by comparing the correlation value in each pixel with a predetermined threshold value, an edge part from a non-edge part contained in each of the plural pieces of divided image data;

the interpolation process section carries out the interpolation process on the edge part with an interpolation method with which the edge part stands out more than the non-edge part; and the difference operation section carries out (i) a horizontal difference operation process for extracting a horizontal edge contained in each of the plural pieces of divided image data and (ii) a vertical difference operation process for extracting a vertical edge contained in each of the plural pieces of divided image data;

when a target pixel is judged as an edge part, the edge-distinguishing section calculates an inclined angle of the edge, the inclined angle of edge being a ratio between a gradation value of a target pixel after the horizontal difference operation process and a gradation value of the target pixel after the vertical difference operation process;

the interpolation process section carries out interpolation process on an interpolation pixel in the edge part with use of gradation values of pixels which are adjacent to the interpolation pixel and selected in the order of distance from a straight line which passes through the interpolation pixel and extends in parallel with an inclining direction of the edge, the number of the pixels to be selected being equal to or smaller than a predetermined number; and the interpolation process section carries out interpolation process on an interpolation pixel in the non-edge part with use of gradation values of pixels which are adjacent to the interpolation pixel; and a display section which displays an image which is upscaled by the image processing device.

7. An image processing method comprising the steps of:

(a) dividing inputted image data into a plural pieces of divided image data; and (b) enhancing a resolution of each of the plural pieces of divided image data, respectively, with a plurality of upscaling process sections; wherein in the step (a), the plural pieces of divided image data being produced so that each one of the plural pieces of divided image data shares a portion with its adjacent one of the plural pieces of divided image data, so that border areas of that one and its adjacent one of the plural pieces of divided image data overlap with each other, each of the plurality of upscaling process sections carrying out:

a difference operation process in which a gradation value of a target pixel is calculated by an operation with use of differentiation or difference of gradation values in vicinity to the target pixel, the gradation value of the target pixel being used for extracting an edge of an article pictured in an image;

an averaging process in which an average value of the gradation values in vicinity to the target pixel is calculated as a gradation value of the target pixel;

a calculation process for obtaining a correlation value indicative of a correlation between difference image data and averaged image data, the difference image data being produced by subjecting the plural pieces of divided image data to the difference operation process, and the averaged image data being produced by subjecting the plural pieces of divided image data to the difference operation process and the averaging process;

an interpolation process on the plural pieces of divided image data with use of an interpolation method which is selected in accordance with the correlation value;

each of the plurality of upscaling process sections includes an edge-distinguishing section which distinguishes, by comparing the correlation value in each pixel with a predetermined threshold value, an edge part from a non-edge part contained in each of the plural pieces of divided image data;

the interpolation process is carried out on the edge part with an interpolation method with which the edge part stands out more than the non-edge part;

the difference operation section carries out (I) a horizontal difference operation process for extracting a horizontal edge contained in each of the plural pieces of divided image data and (ii) a vertical difference operation process for extracting a vertical edge contained in each of the plural pieces of divided image data;

when a target pixel is judged as an edge part, the edge-distinguishing section calculates an inclined angle of the edge, the inclined angle of edge being a ratio between a gradation value of a target pixel after the horizontal difference operation process and a gradation value of the target pixel after the vertical difference operation process;

the interpolation process section carries out interpolation process on an interpolation pixel in the edge part with use of gradation values of pixels which are adjacent to the interpolation pixel and selected in the order of distance from a straight line which passes through the interpolation pixel and extends in parallel with an inclining direction of the edge, the number of the pixels to be selected being equal to or smaller than a predetermined number; and the interpolation process section carries out interpolation process on an interpolation pixel in the non-edge part with use of gradation values of pixels which are adjacent to the interpolation pixel.

* * * * *